US012327538B2

(12) United States Patent
Wang

(10) Patent No.: US 12,327,538 B2
(45) Date of Patent: Jun. 10, 2025

(54) SAXOPHONE MOUTHPIECE

(71) Applicant: John Wang, Taichung (TW)

(72) Inventor: John Wang, Taichung (TW)

( * ) Notice: Subject to any disclaimer, the term of this patent is extended or adjusted under 35 U.S.C. 154(b) by 251 days.

(21) Appl. No.: 18/332,375

(22) Filed: Jun. 9, 2023

(65) Prior Publication Data

US 2024/0412715 A1 Dec. 12, 2024

(51) Int. Cl.
*G10D 9/02* (2020.01)
*G10D 9/035* (2020.01)

(52) U.S. Cl.
CPC .................................... *G10D 9/035* (2020.02)

(58) Field of Classification Search
CPC ............. G10D 9/02; G10D 9/035; G10D 7/08
See application file for complete search history.

(56) References Cited

U.S. PATENT DOCUMENTS 1,413,929 A * 4/1922 Naujoks .................... G10D 9/02 84/383 R
4,345,503 A * 8/1982 Runyon .................... G10D 7/06 84/383 R
4,449,439 A * 5/1984 Wells ........................ G10D 9/02 84/383 R
5,018,425 A * 5/1991 Rovner .................. G10D 9/035 84/383 R
5,105,701 A * 4/1992 Hall .......................... G10D 9/02 84/383 R
5,192,821 A * 3/1993 Goldstein ................ G10D 9/02 84/383 R
5,456,152 A * 10/1995 Cusack .................... G10D 7/06 84/383 R
6,921,853 B2 * 7/2005 Taillard .................... G10D 7/06 84/383 A
10,497,343 B2 * 12/2019 Hashimoto .............. G10H 3/16
2009/0217799 A1 * 9/2009 Rovner .................... G10D 9/02 84/383 R
2024/0412715 A1 * 12/2024 Wang ....................... G10D 7/08

FOREIGN PATENT DOCUMENTS

JP 7457355 B2 * 3/2024

* cited by examiner

*Primary Examiner* — Robert W Horn
(74) *Attorney, Agent, or Firm* — Muncy, Geissler, Olds & Lowe, P.C.

(57) ABSTRACT

A saxophone mouthpiece is provided, comprising a main body. The main body includes an assembling portion and a mouthpiece portion. The mouthpiece portion defines a front end and a rear end relative to each other, and the rear end is connected with the assembling portion. One side of the mouthpiece portion has a window disposed thereon and is configured to be pressed against by a reed, and another side of the mouthpiece portion has a baffle disposed thereon. Two opposite sides of the window have two side rails facing outwardly, and each of the two side rails includes a first arcuate convex segment, a non-arcuate convex segment and a second arcuate convex segment arranged sequentially from the front end toward the rear end. Therefore, a reed arranged on the saxophone mouthpiece can be vibrated smoothly to produce expected tone and scale.

11 Claims, 13 Drawing Sheets

SAXOPHONE MOUTHPIECE

BACKGROUND OF THE INVENTION

Field of the Invention

The present invention relates to a saxophone mouthpiece.

Description of the Prior Art

A saxophone mouthpiece is an instrument vibrator and generates sound by vibrating a reed attached thereon, and then the sound is transmitted into a body of the saxophone. Both of the saxophone mouthpiece and a clarinet mouthpiece use a single reed, and the tone of the instrument may be influenced by a volume of an inner chamber of the mouthpiece, a length of the mouthpiece, a shape of the inner chamber, a window size and material of the mouthpiece. The conventional saxophone mouthpiece includes a window, and the reed is bent toward a front end of the window when the player holds the saxophone mouthpiece in his/her mouth, so that the reed is vibrated relative to side rails of the saxophone mouthpiece when the player blows air. However, the reed is mostly made of bamboo and becomes soft when absorbing too much saliva, the player's lower lip has to exert greater force on the saxophone mouthpiece to control so as to produce correct sound. When the force exerted on the saxophone mouthpiece is too large, the reed is too close to the side rails and a gap between the reed and the side rails is too small so that the reed cannot be vibrated as expected, which results in changes in timbre and inconvenient and undesirable control.

The present invention is, therefore, arisen to obviate or at least mitigate the above-mentioned disadvantages.

SUMMARY OF THE INVENTION

The main object of the present invention is to provide a saxophone mouthpiece, which allows a reed to form a gap with side rails besides its window so that the reed can be vibrated as expected to produce ideal tone and scale when a player blows.

To achieve the above and other objects, the present invention provides a saxophone mouthpiece, including a main body. The main body includes an assembling portion and a mouthpiece portion. The mouthpiece portion defines a front end and a rear end relative to each other, and the rear end is connected with the assembling portion. One side of the mouthpiece portion has a window disposed thereon and is configured to be pressed against by a reed, and another side of the mouthpiece portion has a baffle disposed thereon. Two opposite sides of the window have two side rails facing outwardly, and each of the two side rails includes a first arcuate convex segment, a non-arcuate convex segment and a second arcuate convex segment arranged sequentially from the front end toward the rear end.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 9 for a preferable embodiment of the present invention. A saxophone mouthpiece of the present invention includes a main body 1.

Figure 1:
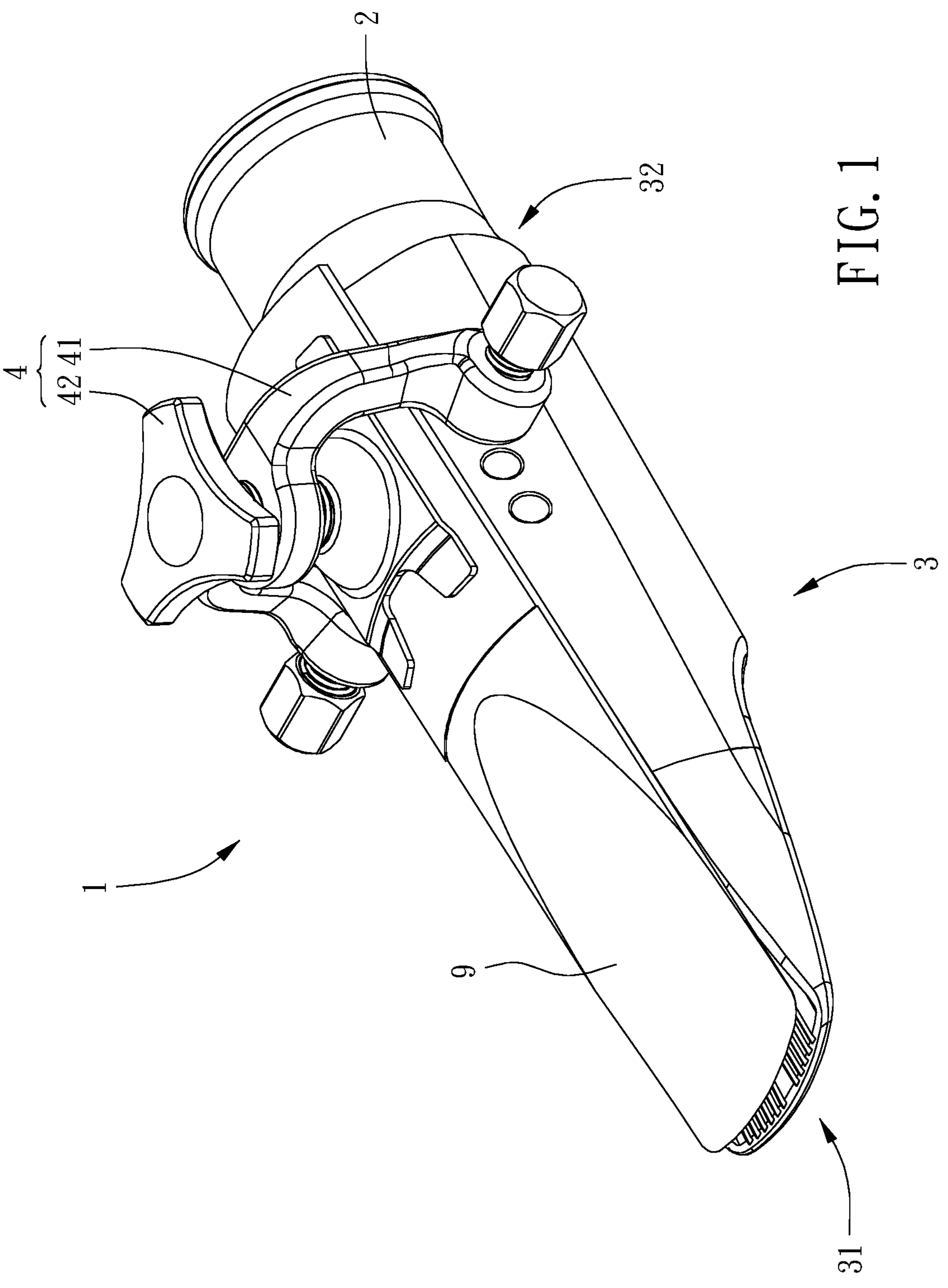
FIGS. 1 and 2 are stereograms of a preferable embodiment of the present invention.
Figure 2:
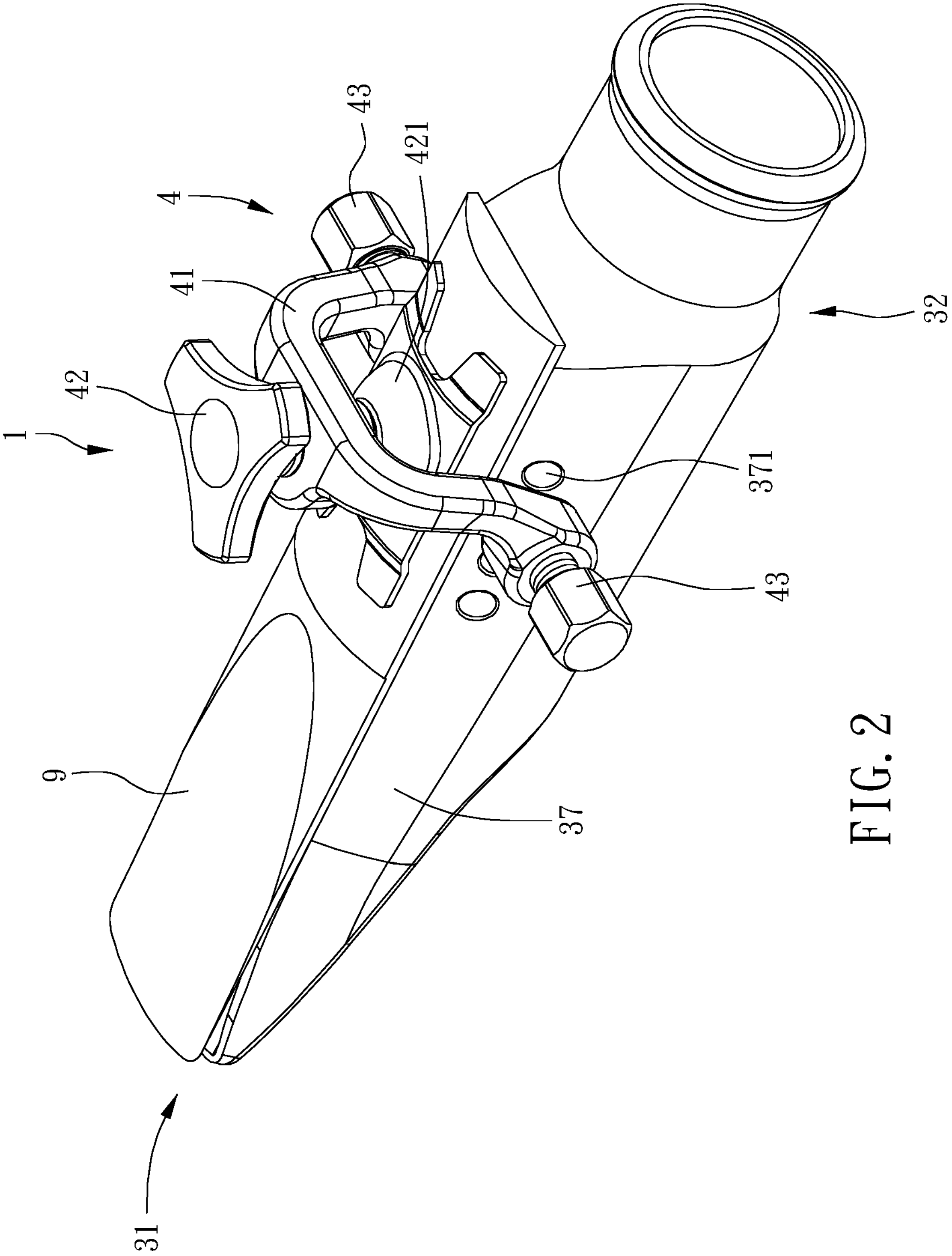
Figure 3:
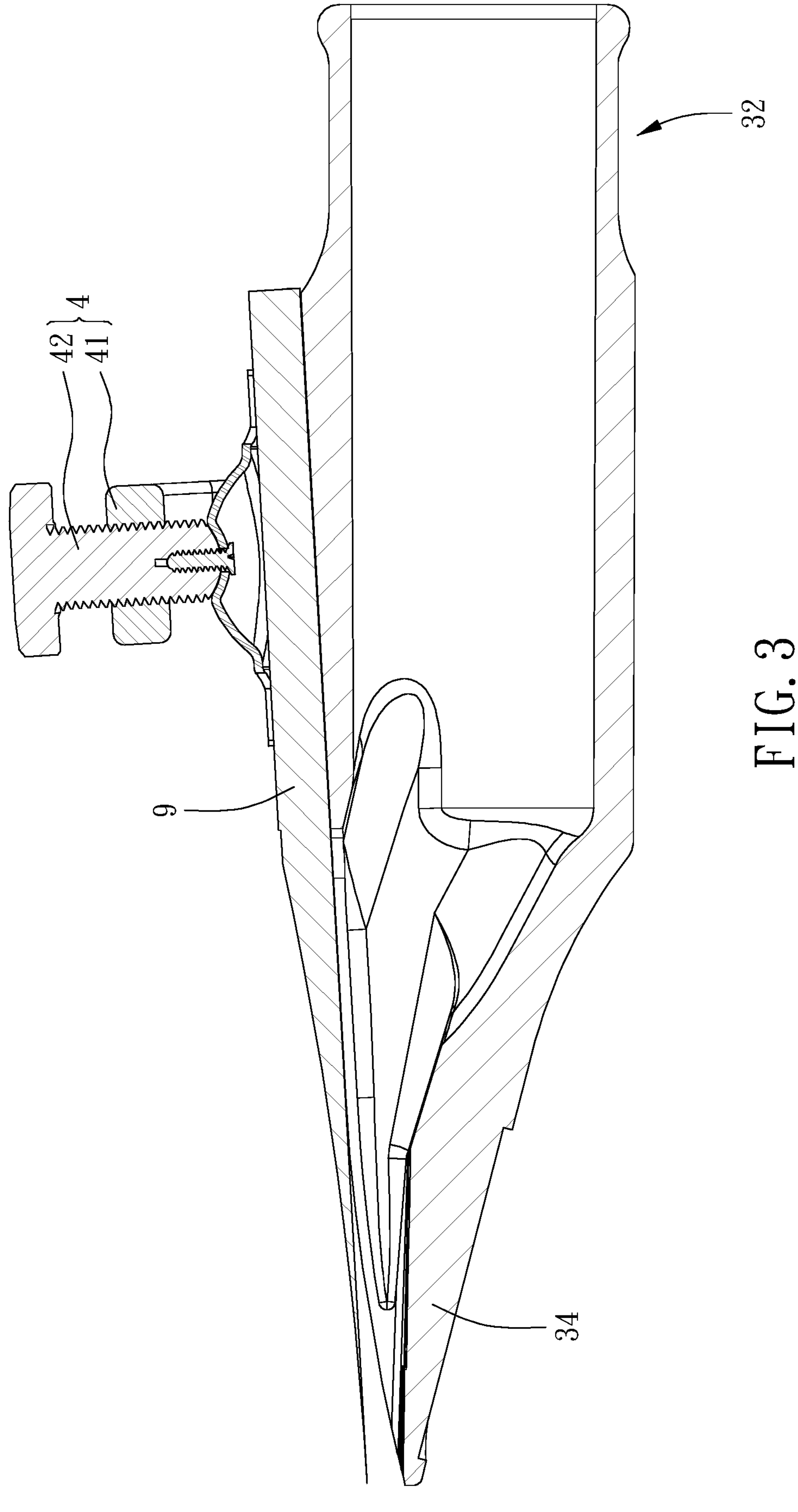
FIG. 3 is a cross-sectional view of a preferable embodiment of the present invention.
Figure 4:
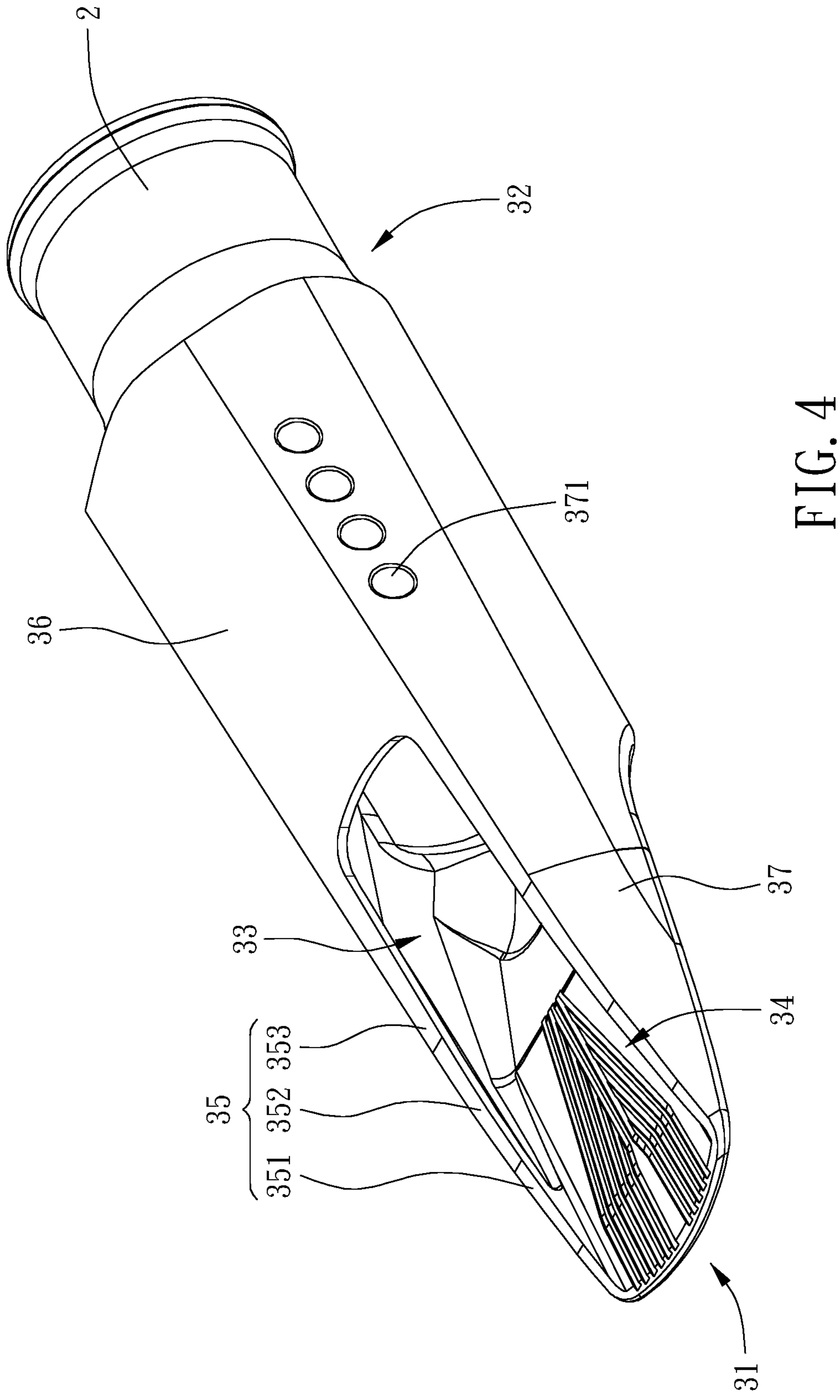
FIG. 4 is a stereogram of a main body according to a preferable embodiment of the present invention.
Figure 5:
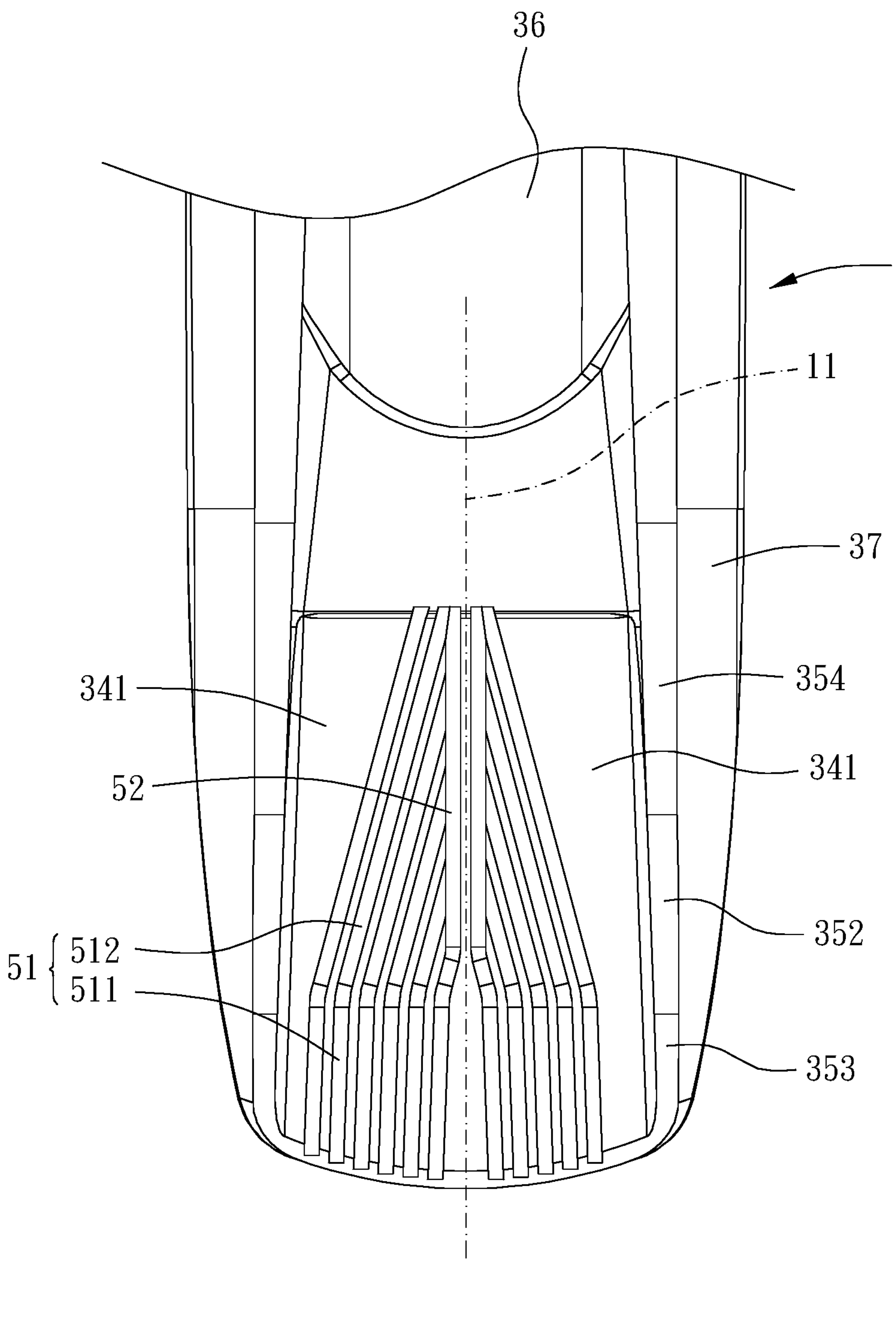
FIG. 5 is a partial top view of the main body according to a preferable embodiment of the present invention.
Figure 6:
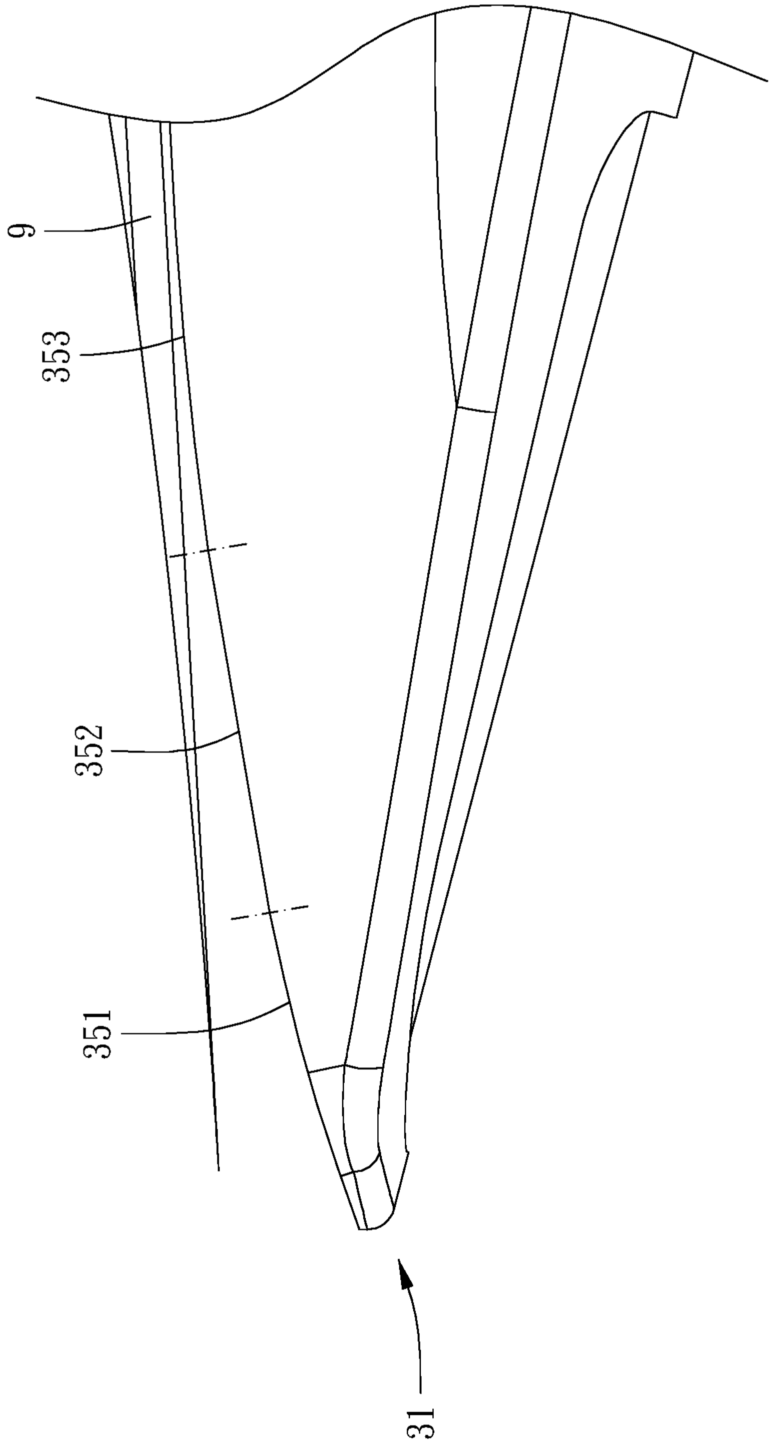
FIG. 6 is a partial side view of a preferable embodiment of the present invention.
Figure 7:
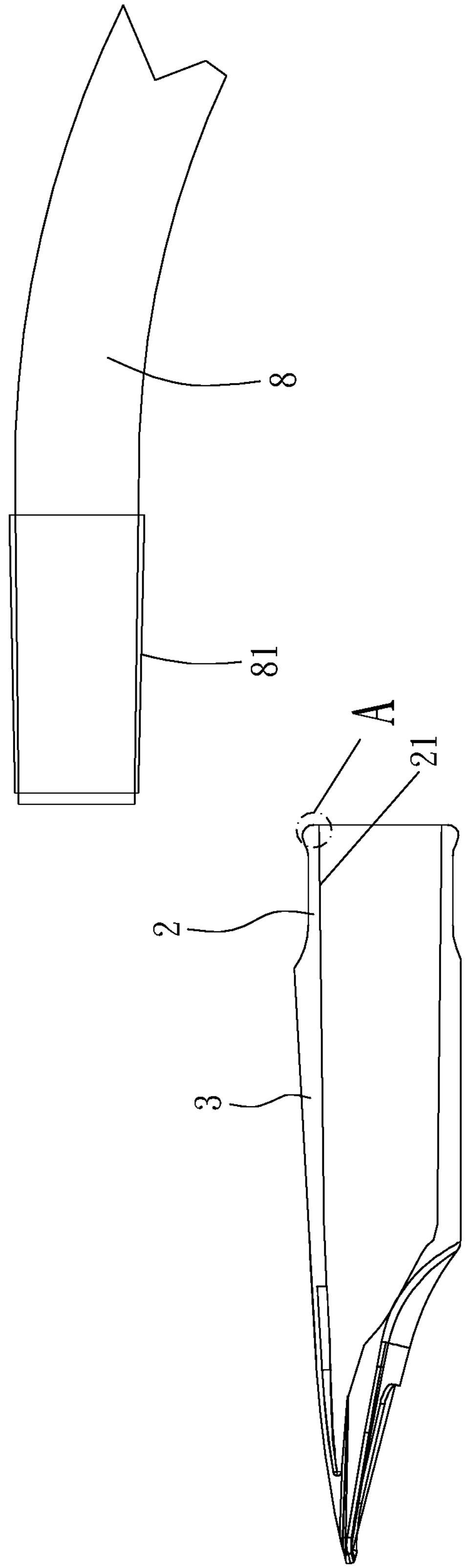
FIG. 7 is a schematic diagram showing assembling of a preferable embodiment of the present invention.
Figure 7A:
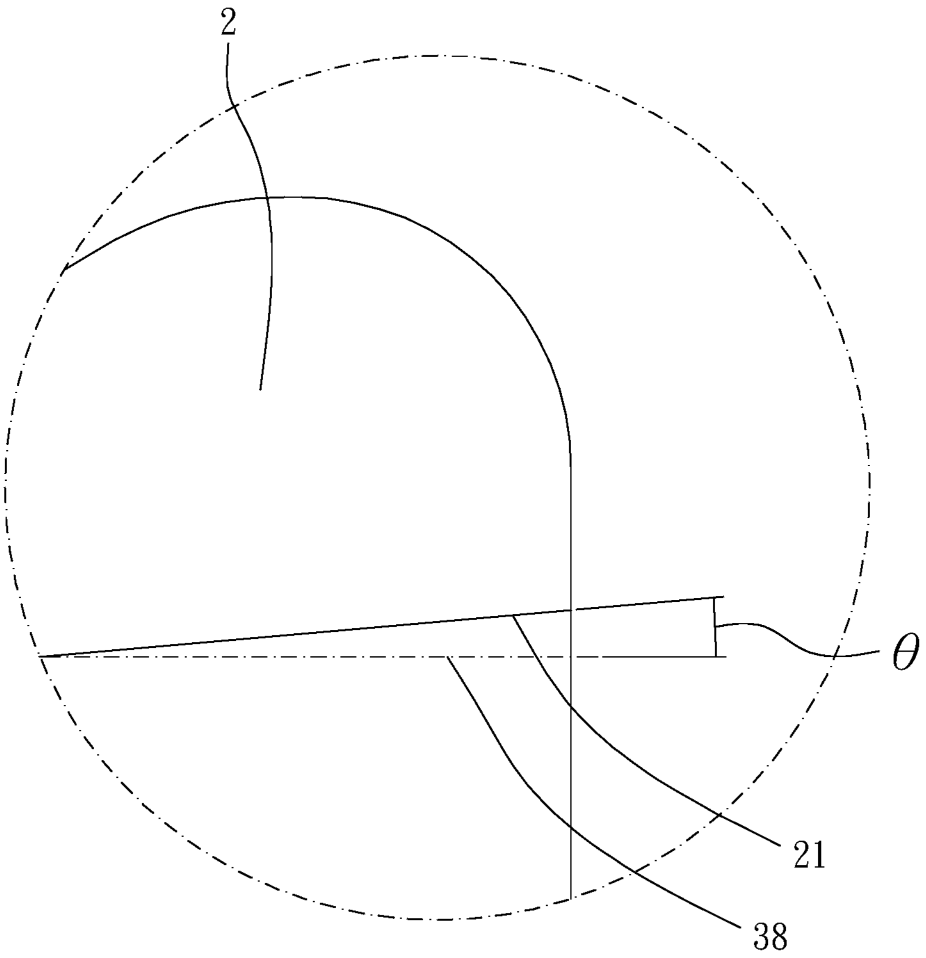
FIG. 7A is an enlargement of A portion in FIG. 7.

The main body 1 includes an assembling portion 2 and a mouthpiece portion 3. The mouthpiece portion 3 defines a front end 31 and a rear end 32 relative to each other, and the rear end 32 is connected with the assembling portion 2. One side of the mouthpiece portion 3 has a window 33 disposed thereon and is configured to be pressed against by a reed 9, another side of the mouthpiece portion 3 has a baffle 34 disposed thereon. Two opposite sides of the window 33 have two side rails 35 facing outwardly, and each of the two side rails 35 includes a first arcuate convex segment 351, a non-arcuate convex segment 352 and a second arcuate convex segment 353 arranged sequentially from the front end 31 toward the rear end 32. Preferably, the assembling portion 2 extends in an axial direction 38, and an inner wall 21 of the assembling portion 2 is tapered in a direction toward the mouthpiece portion 3 (as shown in FIGS. 7 and 7A). The inner wall 21 of the assembling portion 2 and the axial direction 38 define an angle θ therebetween, and the angle θ is between 0.1 degrees and 0.6 degrees. In this embodiment, the angle θ is 0.2 degrees, and the assembling portion 2 is configured to be sleevingly connected with a saxophone neck 8. Therefore, when the assembling portion 2 is sleevingly connected with the saxophone neck 8 being gradually expanded, the inner wall 21 which is slightly inclined allows the assembling portion 2 to be tightly sleeved with a cork 81 of the saxophone neck 8.

For playing, the reed 9 and the mouthpiece portion 3 are held from the front end 31 by a player's mouth. Since each of the two side rails 35 has the first arcuate convex segment 351, the non-arcuate convex segment 352 and the second arcuate convex segment 353 arranged sequentially thereon, the reed 9 is bent in a direction toward the two side rails 35 when the reed 9 and the mouthpiece portion 3 are held by the player's mouth. When the player's mouth holds on a portion of the reed 9 near the rear end 32, the reed 9 is abutted against the second arcuate convex segment 353 and not fully adhered to the non-arcuate convex segment 352 because of a shape of the non-arcuate convex segment 352. Therefore, the reed 9 and the non-arcuate convex segment 352 define a gap therebetween, and the reed 9 can be vibrated effectively to produce low frequency sound. When the player's mouth holds on a portion of the reed 9 near the front end 31, the reed 9 is abutted against the second arcuate convex segment 353 and contacts a junction of the first arcuate convex segment 351 and the non-arcuate convex segment 352, and a portion of the reed 9 corresponds to the first arcuate convex segment 351 can vibrate in a high frequency so as to produce high frequency sound. Therefore, the saxophone mouthpiece of the present invention can effectively produce ideal tone and scale.

Specifically, a bottom portion of the mouthpiece portion 3 has the baffle 34 disposed thereon, and a top portion of the mouthpiece portion 3 includes a top board 36. A side of the top board 36 adjacent to the front end 31 has the window 33 disposed thereon, and the top board 36 is configured to be pressed against by the reed 9. The mouthpiece portion 3 further includes two side boards 37, and the two side boards 37 are connected between the top board 36 and the baffle 34.

In this embodiment, the saxophone mouthpiece further includes a positioning assembly 4, and two ends of the positioning assembly 4 are respectively connected with the two side boards 37. The positioning assembly 4 is configured to urge the reed 9 to be pressed against the top board 36 so as to position the reed 9. Preferably, the positioning assembly 4 includes a positioning member 41 being U-shaped and a pressing member 42, and two ends of the positioning member 41 are assembled to the two side boards 37. The pressing member 42 is screwingly connected with the positioning member 41 and configured to press the reed 9 toward and against the top board 36 so that a force that the reed 9 pressed against the top board 36 is adjustable by turning the pressing member 42 for tuning. An end of the pressing member 42 has a pressing plate 421 disposed thereon, and the pressing plate 421 is configured to be pressed against the reed 9. The two side boards 37 respectively have a plurality of locking holes 371 disposed thereon, and the positioning assembly 4 is assembled to the two side boards 37 by two fasteners 43 respectively screwed with one of the plurality of locking holes 371 of one of the two side boards 37. Each of the two fasteners 43 is selectively disposed through one of the locking holes 371 of one of the two side boards 37, which is adjustable according to a material of the reed 9.

An extending length of the non-arcuate convex segment 352 is greater than an extending length of the first arcuate convex segment 351, and the extending length of the non-arcuate convex segment 352 is shorter than an extending length of the second arcuate convex segment 353 so that a portion of the reed 9 corresponding to the first arcuate convex segment 351 is relatively short for high-frequency vibration.

Figure 8:
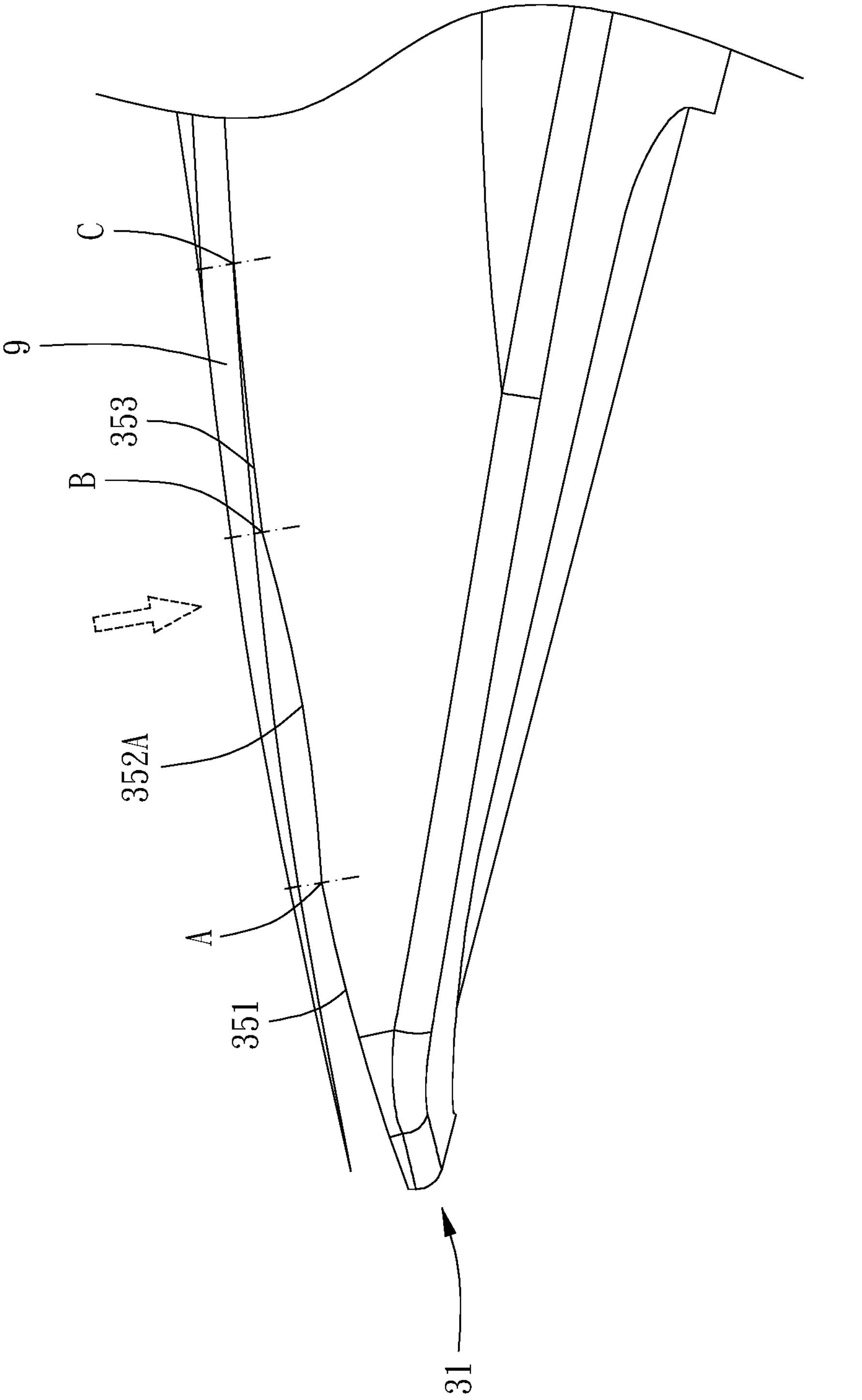
FIGS. 8 and 9 are partial side views of another preferable embodiment of the present invention.
Figure 9:
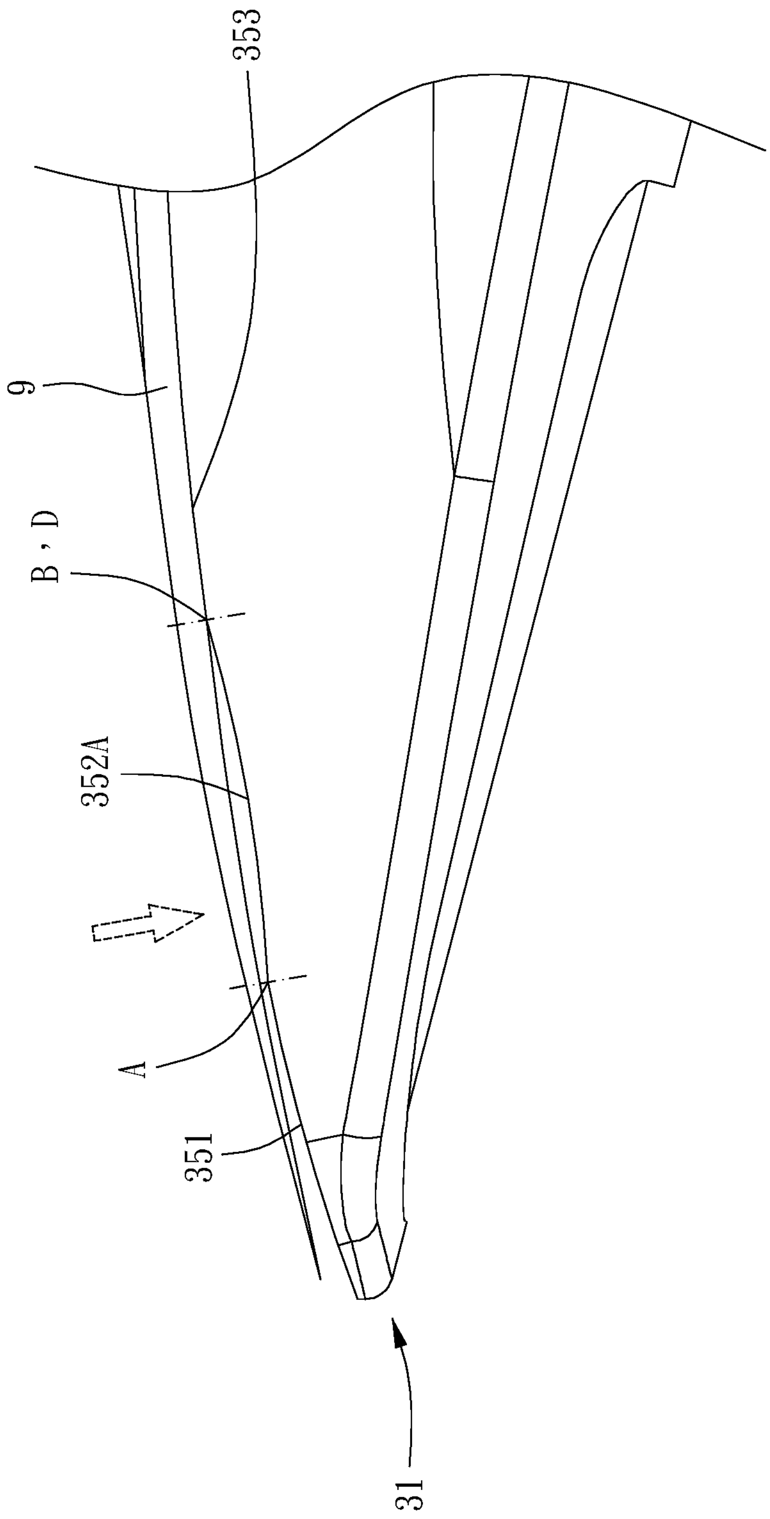

Specifically, the non-arcuate convex segment 352 is a flat surface or concave surface, and a curvature of the first arcuate convex segment 351 is identical to a curvature of the second arcuate convex segment 353. In this embodiment, the non-arcuate convex segment 352 is a flat surface. Please refer to FIGS. 8 and 9 showing another preferable embodiment of the present invention. The non-arcuate convex segment 352A is a concave surface, which prevents the reed 9 from contacting the non-arcuate convex segment 352A. A junction of the non-arcuate convex segment 352A and the first arcuate convex segment 351 is defined as a first intersection point A, and a junction of the non-arcuate convex segment 352A and the second arcuate convex segment 353 is defined as a second intersection point B. When the player's mouth holds on a portion of the reed 9 near the second intersection point B (as shown in FIG. 8), the reed 9 is bent less, a first contact end C of the reed 9 is located at the second arcuate convex segment 353, and the reed 9 is not in contact with the second intersection point B. A portion of the reed 9 being not in contact with the mouthpiece portion 3 is longer and is vibrated with the first contact end C as a fulcrum so that the reed 9 has a large vibration arc and is easy to produce low frequency sound. When the player's mouth holds on a portion of the reed 9 near the first intersection point A (as shown in FIG. 9), the reed 9 is bent more, a second contact end D of the reed 9 is located at the second intersection point B, and a portion of the reed 9 being not in contact with the mouthpiece portion 3 is shorter and is vibrated with the second contact end D as a fulcrum so that the reed 9 has a small vibration arc, and the reed 9 can easily produce high frequency sound. Therefore, the present invention allows the reed 9 to vibrate with one of two fulcrums located at different positions so as to smoothly produce expected scale.

Please refer to FIGS. 1 to 7, the main body 1 is symmetrically arranged relative to and extends along a central line 11, and a side of the baffle 34 facing toward the window 33 has a plurality of first guiding channels 51 and two second guiding channels 52 recessed thereon. The central line 11 symmetrically divides the baffle 34 into two regions 341, and each of the plurality of first guiding channels 51 includes a first guiding groove 511 and a second guiding groove 512 communicated with each other. An extending direction of each said first guiding groove 511 is substantially parallel to the central line 11, and an extending direction of each said second guiding groove 512 is oblique to the extending direction of one of said first guiding grooves 511. The plurality of first guiding channels 51 are spaced apart from the central line 11 and symmetrically arranged at the two regions 341 relative to the central line 11. A plurality of said second guiding grooves 512 located at the two regions 341 extend obliquely toward the central line 11, and of the two second guiding channels 52 extend parallel to the central line 11 and are located at two opposite sides of the central line 11. The two second guiding channels 52 are respectively communicated with the plurality of said second guiding grooves 512 located at the two regions 341.

The plurality of first guiding channels 51 are configured to guide gas entering from the front end 31 to flow in a designated path, and the plurality of said second guiding grooves 512 extend obliquely toward the central line 11 for gathering the gas. The gas entering from the front end 31 flows through the plurality of first guiding channels 51 has sufficient power to flow, which allows the player to produce a fuller and more mellow tone with a smaller blowing force, and allows the player with a small lung capacity to easily and quickly control the instrument they are playing.

The two second guiding channels 52 are communicated with the plurality of said second guiding grooves 512 of the plurality of first guiding channels 51 so as to provide confluence effect and exhaust the gas together, which makes the gas more concentrated and flow faster. Moreover, the two second guiding channels 52 extend parallel to the central line 11 so as to guide the gas to uniformly flow in a direction parallel to the central line 11.

Figure 10:
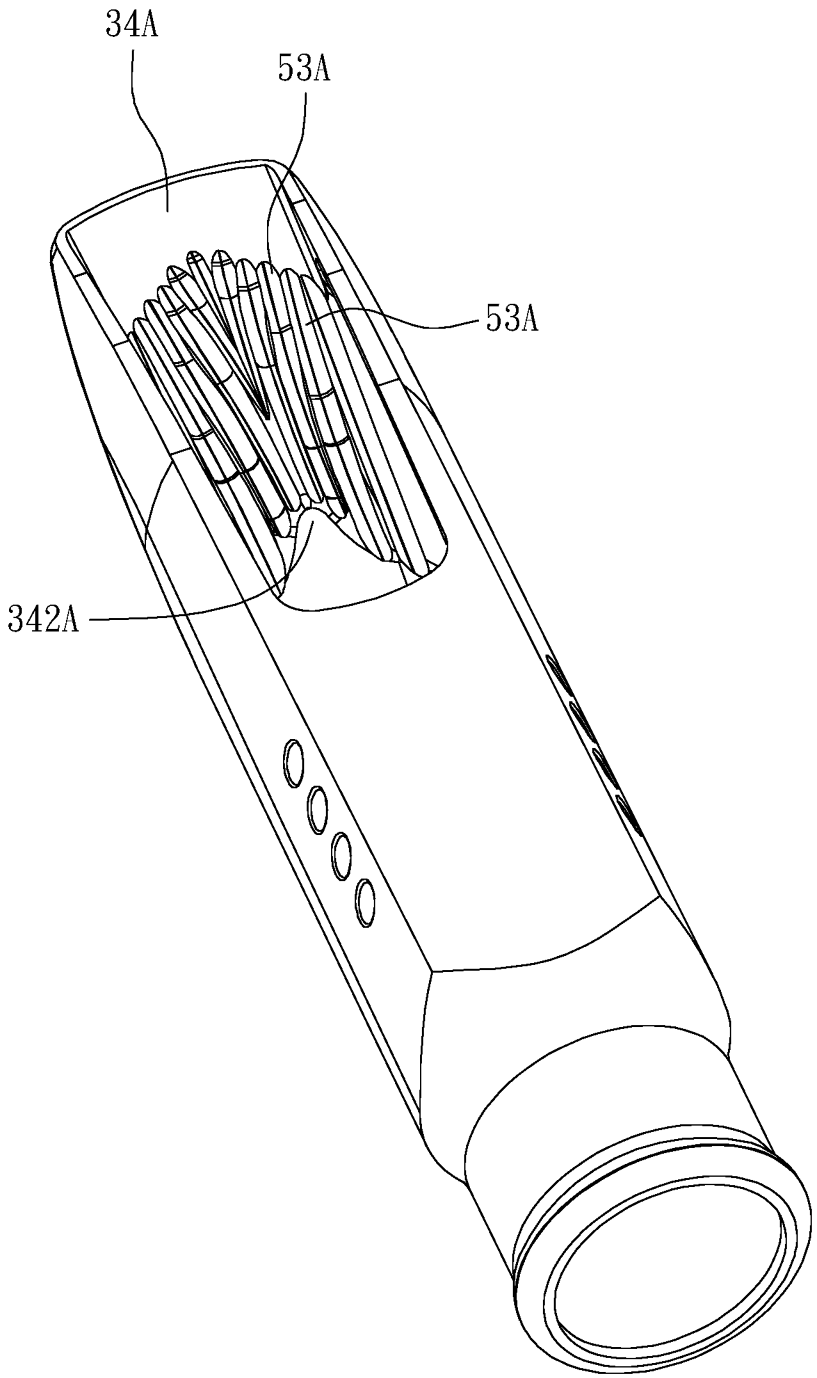
FIG. 10 is a stereogram of a main body according to another preferable embodiment of the present invention.
Figure 11:
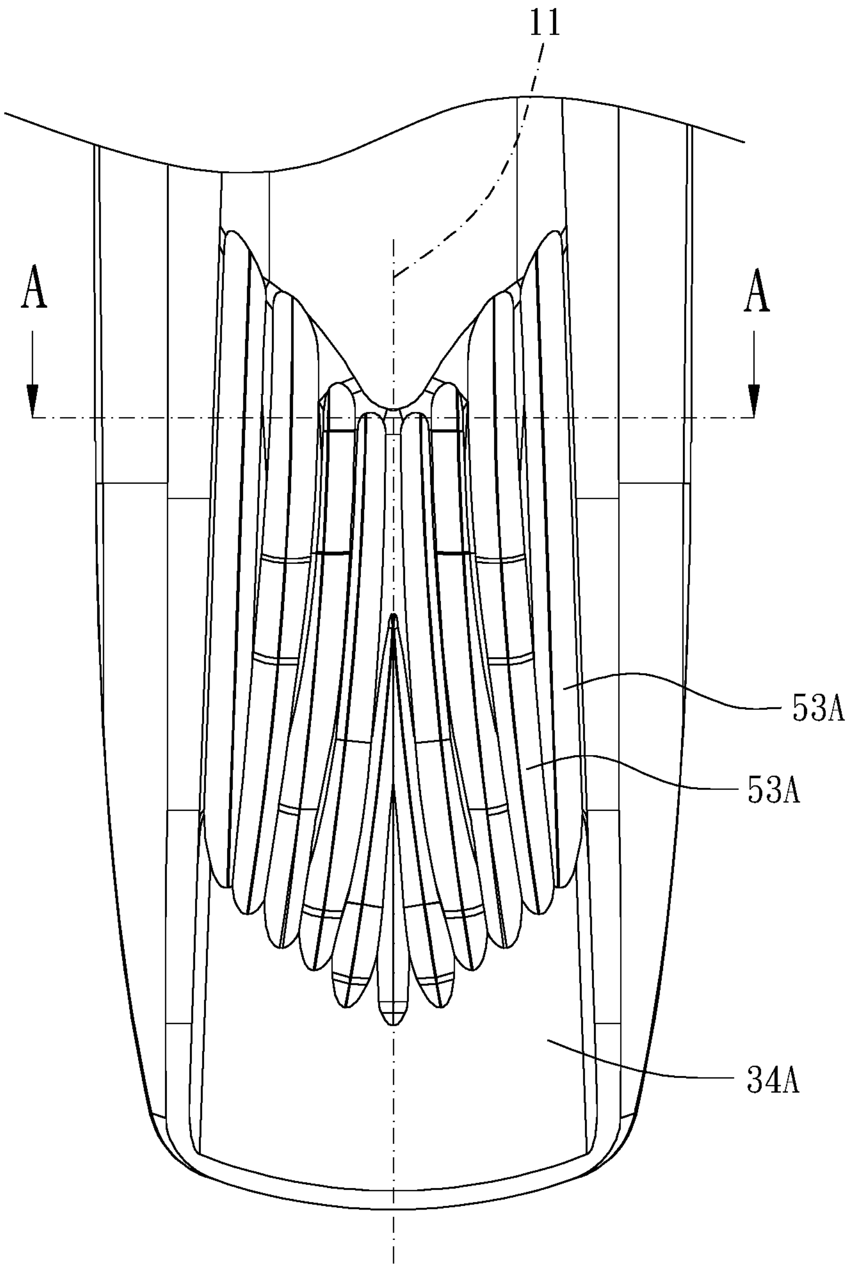
FIG. 11 is a partial top view of another preferable embodiment of the present invention.
Figure 12:
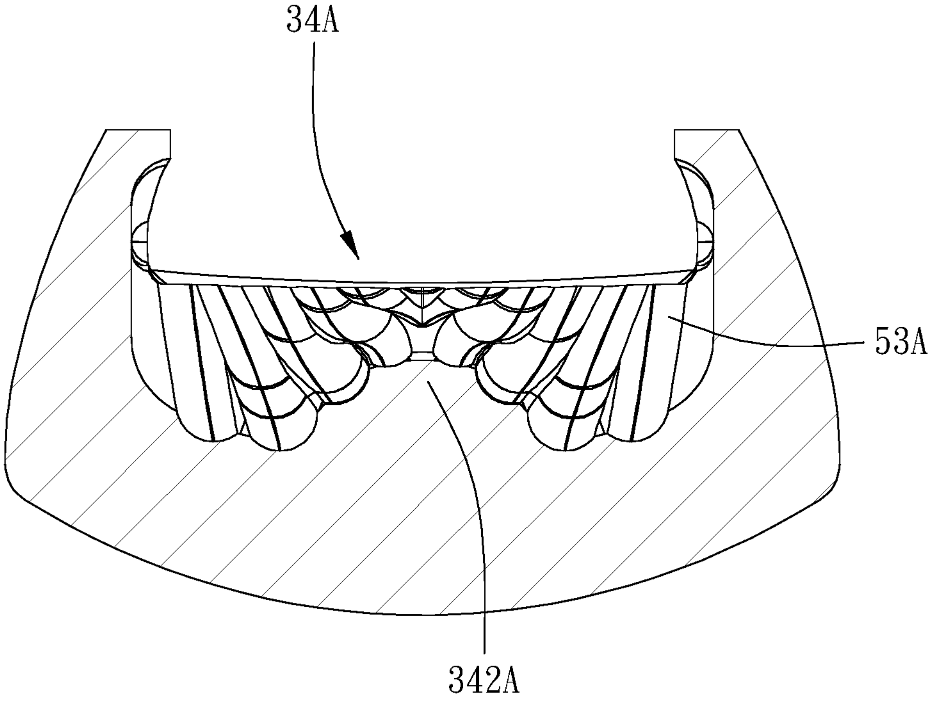
FIG. 12 is a cross-sectional view taken along line A-A of FIG. 11.

Please refer to FIGS. 9 to 11 showing another preferable embodiment of the present invention. A side of the baffle 34A facing toward the window 33 has a plurality of third guiding channels 53A recessed thereon, and the baffle 34A has a protruding portion 342A arranged on a side of the central line 11 close to the rear end. Extending lengths of the plurality of third guiding channels 53A are the same with one another, and a portion of the plurality of third guiding channels 53A adjacent to the central line 11 extends outwardly toward the front end 31. Therefore, the gas adjacent to the central line 11 is preferentially guided by a portion of the plurality of third guiding channels 53A, and the protruding portion 342A guides the gas to flow to the reed so as to improve the vibration effect of the reed.

Although particular embodiments of the invention have been described in detail for purposes of illustration, various modifications and enhancements May be made without departing from the spirit and scope of the invention. Accordingly, the invention is not to be limited except as by the appended claims.

What is claimed is:

1. A saxophone mouthpiece, including:

a main body, including an assembling portion and a mouthpiece portion, the mouthpiece portion defining a front end and a rear end relative to each other, the rear end connected with the assembling portion, one side of the mouthpiece portion having a window disposed thereon and configured to be pressed against by a reed, another side of the mouthpiece portion having a baffle disposed thereon, two opposite sides of the window having two side rails facing outwardly, each of the two side rails including a first arcuate convex segment, a non-arcuate convex segment and a second arcuate convex segment arranged sequentially from the front end toward the rear end.

2. The saxophone mouthpiece of claim 1, wherein a bottom portion of the mouthpiece portion has the baffle disposed thereon, a top portion of the mouthpiece portion includes a top board, a side of the top board adjacent to the front end has the window disposed thereon, and the top board is configured to be pressed against by the reed.

3. The saxophone mouthpiece of claim 2, wherein the mouthpiece portion further includes two side boards, and the two side boards are connected between the top board and the baffle.

4. The saxophone mouthpiece of claim 3, further including a positioning assembly, wherein two ends of the positioning assembly are respectively connected with the two side boards, and the positioning assembly is configured to urge the reed to be pressed against the top board.

5. The saxophone mouthpiece of claim 4, wherein the positioning assembly includes a positioning member being U-shaped and a pressing member, two ends of the positioning member are assembled to the two side boards, and the pressing member is screwingly connected with the positioning member and configured to press the reed toward and against the top board.

6. The saxophone mouthpiece of claim 4, wherein the two side boards respectively have a plurality of locking holes disposed thereon, and the positioning assembly is assembled to the two side boards by two fasteners respectively screwed with one of the plurality of locking holes of one of the two side boards.

7. The saxophone mouthpiece of claim 1, wherein an extending length of the non-arcuate convex segment is greater than an extending length of the first arcuate convex segment, and the extending length of the non-arcuate convex segment is shorter than an extending length of the second arcuate convex segment.

8. The saxophone mouthpiece of claim 1, wherein the non-arcuate convex segment is a flat surface or a concave surface, and a curvature of the first arcuate convex segment is identical to a curvature of the second arcuate convex segment.

9. The saxophone mouthpiece of claim 1, wherein the main body is symmetrically arranged relative to and extends along a central line, a side of the baffle facing toward the window has a plurality of first guiding channels and two second guiding channels recessed thereon, the central line symmetrically divides the baffle into two regions, each of the plurality of first guiding channels includes a first guiding groove and a second guiding groove communicated with each other, an extending direction of each said first guiding groove is substantially parallel to the central line, an extending direction of each said second guiding groove is oblique to the extending direction of one of said first guiding grooves, the plurality of first guiding channels are spaced apart from the central line and symmetrically arranged at the two regions relative to the central line, a plurality of said second guiding grooves located at the two regions extend obliquely toward the central line, and the two second guiding channels extend parallel to the central line and are located at two opposite sides of the central line, and the two second guiding channels are respectively communicated with the plurality of said second guiding grooves located at the two regions.

10. The saxophone mouthpiece of claim 1, wherein the main body is symmetrically arranged relative to and extends along an central line, a side of the baffle facing toward the window has a plurality of third guiding channels recessed thereon, the baffle has a protruding portion arranged on a side of the central line near the rear end, extending lengths of the plurality of third guiding channels are the same with one another, and a portion of the plurality of third guiding channels adjacent to the central line extends outwardly toward the front end.

11. The saxophone mouthpiece of claim 1, wherein the assembling portion extends in an axial direction, an inner wall of the assembling portion is tapered in a direction toward the mouthpiece portion, the inner wall of the assembling portion and the axial direction define an angle therebetween, the angle is between 0.1 degrees and 0.6 degrees, and the assembling portion is configured to be sleevingly connected with a saxophone neck.

* * * * *